(12) United States Patent
Revah et al.

(10) Patent No.: US 9,876,719 B2
(45) Date of Patent: Jan. 23, 2018

(54) METHOD AND APPARATUS FOR LOAD BALANCING IN NETWORK SWITCHES

(71) Applicant: MARVELL WORLD TRADE LTD., St. Michael (BB)

(72) Inventors: Yoram Revah, Akko (IL); David Melman, Halutz (IL); Tal Mizrahi, Haifa (IL); Rami Zemach, Givat Shapira (IL); Carmi Arad, Nofit (IL)

(73) Assignee: Marvell World Trade Ltd., St. Michael (BB)

( * ) Notice: Subject to any disclaimer, the term of this patent is extended or adjusted under 35 U.S.C. 154(b) by 137 days.

(21) Appl. No.: 15/061,755

(22) Filed: Mar. 4, 2016

(65) Prior Publication Data

US 2016/0261500 A1    Sep. 8, 2016

Related U.S. Application Data

(60) Provisional application No. 62/129,507, filed on Mar. 6, 2015.

(51) Int. Cl.
*H04L 12/26* (2006.01)
*H04L 12/743* (2013.01)
(Continued)

(52) U.S. Cl.
CPC .......... *H04L 45/7453* (2013.01); *H04L 45/22* (2013.01); *H04L 45/245* (2013.01);
(Continued)

(58) Field of Classification Search
CPC ......... H04L 45/50; H04L 45/02; H04L 45/04; H04L 45/28; H04L 45/22; H04L 47/70;
(Continued)

(56) References Cited

U.S. PATENT DOCUMENTS 5,032,987 A    7/1991  Broder et al.
6,035,107 A    3/2000  Kuehlmann et al.
(Continued)

FOREIGN PATENT DOCUMENTS

EP    1729461    12/2006

OTHER PUBLICATIONS

U.S. Appl. No. 14/657,898, Roitshtein et al., "Resilient Hash Computation for Load Balancing in Network Switches," filed Mar. 13, 2015.
(Continued)

*Primary Examiner* — Sai Aung

(57) ABSTRACT

A forwarding engine in a network device selects one or more groups of multiple egress interfaces of the network device for forwarding packets received by the network device. An egress interface selector in the network device selects individual egress interfaces within the one or more groups selected by the forwarding engine. The egress interface selector includes a table associated with a first group of multiple egress interfaces, wherein elements in the table include values indicate individual egress interfaces in the first group. When the forwarding engine selects the first group, a table element selector of selects an element in the table to identify the individual egress interface for forwarding the packet.

19 Claims, 4 Drawing Sheets

(51) Int. Cl.
*H04L 12/741* (2013.01)
*H04L 12/707* (2013.01)
*H04L 12/709* (2013.01)
*H04L 12/703* (2013.01)
*H04L 12/803* (2013.01)

(52) U.S. Cl.
CPC ............ *H04L 45/28* (2013.01); *H04L 45/745* (2013.01); *H04L 47/125* (2013.01)

(58) Field of Classification Search
CPC ..... H04L 47/825; H04L 45/00; H04L 45/302; H04L 12/4633; H04L 43/0876
See application file for complete search history.

(56) References Cited

U.S. PATENT DOCUMENTS

| | | |
|---|---|---|
| 6,249,521 B1 | 6/2001 | Kerstein |
| 6,363,396 B1 | 3/2002 | Klots et al. |
| 6,430,170 B1 | 8/2002 | Saints et al. |
| 6,614,758 B2 | 9/2003 | Wong et al. |
| 6,735,670 B1 | 5/2004 | Bronstein et al. |
| 6,757,742 B1 | 6/2004 | Viswanath |
| 6,973,082 B2 | 12/2005 | Devi et al. |
| 7,190,696 B1 | 3/2007 | Manur et al. |
| 7,224,845 B1 | 5/2007 | Russo et al. |
| 7,280,527 B2 | 10/2007 | Basso et al. |
| 7,346,706 B2 | 3/2008 | Rezaaifar et al. |
| 7,424,016 B2 | 9/2008 | Sweeney et al. |
| 7,539,750 B1 | 5/2009 | Parker et al. |
| 7,554,914 B1 | 6/2009 | Li et al. |
| 7,567,567 B2 | 7/2009 | Muller et al. |
| 7,580,417 B2 | 8/2009 | Ervin et al. |
| 7,613,209 B1 | 11/2009 | Nguyen et al. |
| 7,623,455 B2 | 11/2009 | Hilla et al. |
| 7,639,614 B2 | 12/2009 | Nakagawa et al. |
| 7,796,594 B2 | 9/2010 | Melman et al. |
| 7,821,925 B2 | 10/2010 | Davies |
| 7,821,931 B2 | 10/2010 | Swenson et al. |
| 7,898,959 B1 | 3/2011 | Arad |
| 7,969,880 B2 | 6/2011 | Yano et al. |
| 7,979,671 B2 | 7/2011 | Aviles |
| 8,004,990 B1 | 8/2011 | Callon |
| 8,090,805 B1* | 1/2012 | Chawla ................. H04L 12/00 709/221 |
| 8,238,250 B2 | 8/2012 | Fung |
| 8,243,594 B1 | 8/2012 | Fotedar et al. |
| 8,244,909 B1 | 8/2012 | Hanson et al. |
| 8,274,971 B2 | 9/2012 | Battle et al. |
| 8,339,951 B2 | 12/2012 | Scaglione |
| 8,355,328 B2 | 1/2013 | Matthews et al. |
| 8,364,711 B2 | 1/2013 | Wilkins et al. |
| 8,503,456 B2 | 8/2013 | Matthews et al. |
| 8,587,674 B2 | 11/2013 | Iwata |
| 8,614,950 B2 | 12/2013 | Roitshtein et al. |
| 8,625,594 B2 | 1/2014 | Safrai et al. |
| 8,660,005 B2 | 2/2014 | Roitshtein et al. |
| 8,756,424 B2 | 6/2014 | Roitshtein et al. |
| 8,792,497 B2 | 7/2014 | Rajagopalan et al. |
| 8,848,728 B1 | 9/2014 | Revah et al. |
| 9,237,100 B1 | 1/2016 | Mizrahi et al. |
| 2002/0093952 A1 | 7/2002 | Gonda |
| 2003/0043825 A1 | 3/2003 | Magnussen et al. |
| 2003/0147385 A1 | 8/2003 | Montalvo et al. |
| 2003/0188018 A1* | 10/2003 | Guerrero ............... H04L 49/253 709/242 |
| 2003/0210688 A1 | 11/2003 | Basso et al. |
| 2003/0235168 A1 | 12/2003 | Sharma et al. |
| 2004/0073640 A1 | 4/2004 | Martin et al. |
| 2005/0213582 A1 | 9/2005 | Wakumoto et al. |
| 2006/0193333 A1* | 8/2006 | Baughan ................ H04L 45/02 370/400 |
| 2006/0251109 A1 | 11/2006 | Muller et al. |
| 2007/0280258 A1 | 12/2007 | Rajagopalan et al. |
| 2007/0282748 A1* | 12/2007 | Saint Clair ............. H04L 41/06 705/51 |
| 2008/0031263 A1 | 2/2008 | Ervin et al. |
| 2008/0037544 A1 | 2/2008 | Yano et al. |
| 2008/0049774 A1 | 2/2008 | Swenson et al. |
| 2008/0052488 A1 | 2/2008 | Fritz et al. |
| 2008/0084881 A1 | 4/2008 | Dharwadkar et al. |
| 2008/0181103 A1 | 7/2008 | Davies |
| 2008/0205655 A1 | 8/2008 | Wilkins et al. |
| 2009/0196303 A1 | 8/2009 | Battle et al. |
| 2009/0274154 A1 | 11/2009 | Kopelman et al. |
| 2010/0023726 A1 | 1/2010 | Aviles |
| 2010/0142410 A1 | 6/2010 | Huynh Van et al. |
| 2010/0214913 A1 | 8/2010 | Kompella |
| 2011/0013627 A1 | 1/2011 | Matthews et al. |
| 2011/0013638 A1 | 1/2011 | Matthews et al. |
| 2011/0013639 A1 | 1/2011 | Matthews et al. |
| 2011/0102612 A1 | 5/2011 | Iwata |
| 2011/0134925 A1 | 6/2011 | Safrai et al. |
| 2011/0295894 A1 | 12/2011 | Yoo |
| 2011/0296411 A1 | 12/2011 | Tang et al. |
| 2012/0136846 A1 | 5/2012 | Song et al. |
| 2013/0013880 A1 | 1/2013 | Tashiro et al. |
| 2013/0024541 A1* | 1/2013 | Ziegler .................. H04L 47/39 709/217 |
| 2013/0242985 A1 | 9/2013 | Basso et al. |
| 2014/0093073 A1 | 4/2014 | Horgan et al. |
| 2014/0119193 A1 | 5/2014 | Anand et al. |
| 2014/0160934 A1 | 6/2014 | Roitshtein et al. |
| 2014/0301394 A1 | 10/2014 | Arad et al. |
| 2014/0325228 A1 | 10/2014 | Roitshtein et al. |

OTHER PUBLICATIONS

International Search Report and Written Opinion in International Application No. PCT/IB2016/000321, dated Jun. 13, 2016 (11 pages).

* cited by examiner

METHOD AND APPARATUS FOR LOAD BALANCING IN NETWORK SWITCHES

CROSS REFERENCE TO RELATED APPLICATION

The present application claims the benefit of U.S. Provisional Patent App. No. 62/129,507, entitled "Resilient Hash," filed on Mar. 6, 2015, which is hereby incorporated by reference in its entirety.

FIELD OF TECHNOLOGY

The present disclosure relates generally to communication systems and, more particularly, to using hash functions to select network interfaces in a group of network interfaces.

BACKGROUND

Today, hash functions are widely used in a variety of computing applications to map data in a larger set to a value in a smaller set. For example, a relatively long sequence of bits may be supplied as an input into a mathematical function to generate a shorter sequence of bits that serves as an index into a database table.

One area of application in which hashing can be particularly useful is network switching. In general, a network switch may receive and transmit data packets via multiple ports. In some situations, there may be more than one possible network link via which a packet can be transmitted to properly forward the data packet to its destination. Moreover, network links sometimes are purposefully aggregated to provide more bandwidth between communicating devices or networks. Grouping links together to define wider communication channels in the context of Layer-2 networking is sometimes referred to as link aggregation (LAG). In the context of Layer-3 networking, a routing technique typically referred to as equal-cost multi-path (ECMP) routing is utilized in situations where multiple paths present equally attractive routing choices to a network switch. Another Layer-2 network routing technique, referred to as weighted-cost multipath (WCMP) routing, may be utilized when different paths in a group exhibit unequal throughput rates.

A hash function is sometimes used to select one of the links or paths in a group of links/paths (e.g., a LAG group, an ECMP group, a WCMP group, a group of links/paths in a switch fabric, etc.) to transmit a packet. For example, the hash function can be applied to a portion or portions of a header of the packet, and a result of the hash function then indicates one of the links/paths in the group of links/paths via which the packet is to be transmitted.

SUMMARY OF THE DISCLOSURE

In an embodiment, a network device comprises a plurality of egress interfaces configured to transmit packets. The network device also comprises a forwarding engine configured to select one or more groups of multiple egress interfaces for forwarding packets received by the network device, and an egress interface selector configured to select individual egress interfaces within the one or more groups selected by the forwarding engine. The egress interface selector includes a table associated with a first group of multiple egress interfaces, wherein elements in the table include values indicating individual egress interfaces in the first group, and a table element selector configured to, when the forwarding engine selects the first group of multiple egress interfaces for forwarding a packet, select an element in the table to identify the individual egress interface for forwarding the packet.

In other embodiments, the network device includes any one of or any suitable combination of two or more of the following features.

The table element selector includes a hash calculator configured to generate an output using i) a hashing function and ii) header information of the packet, wherein the output indicates the element in the table that is to be selected.

The table includes N elements, wherein N is suitable positive integer, and the hash calculator is configured to generate the output so that the output is from a set of N possible values.

The hash calculator is configured to perform a modulo-N operation on an initial output.

The network device further comprises an egress interface group manager configured to, in response to determining that an additional egress interface is to be added to the first group of multiple egress interfaces, replace values in a subset of elements in the table with new values that indicate the additional egress interface.

The egress interface group manager is configured to select the subset of elements so that elements in the table are balanced across the first group of multiple egress interfaces including the additional egress interface.

The network device further comprises an egress interface group manager configured to, in response to determining that a current egress interface is to be removed from the first group of multiple egress interfaces, replace first values in the table that indicate the current egress interface with second values that indicate other egress interfaces in the first group.

The egress interface group manager is further configured to, when replacing the first values in the table, randomly select the second values that are to replace the first values.

The egress interface group manager is further configured to, when replacing the first values in the table, select the second values that are to replace the first values in a round-robin manner.

The egress interface group manager is further configured to, when replacing the first values in the table, select the second values that are to replace the first values based on respective traffic loads of the other egress interfaces in the first group.

In another embodiment, a method for selecting an egress interface includes receiving a packet at a network device; selecting, at the network device, a group of multiple egress interfaces for transmitting the packet, the group from a plurality of egress interfaces of the network device; in response to selecting the group, selecting, at the network device, an element in a table corresponding to the group, wherein entries in the table indicate individual egress interfaces in the group; and transferring the packet to an egress interface in the group indicated by a value in the selected element of the table so that the packet can be transmitted by the egress interface in the group indicated by the value in the selected element of the table.

In other embodiments, the method includes any one of or any suitable combination of two or more of the following features.

Selecting the element in the table comprises: calculating, at the network device, a hash value using header information of the packet; and using the hash value as an index into the table.

The table includes N elements, where N is suitable positive integer.

Calculating the hash value comprises at least one of: i) calculating the hash value so that the hash value is from a set of N possible values, and ii) calculating an initial hash value and performing a modulo-N operation on the initial hash value.

The method further includes: determining, at the network device, that an additional egress interface is to be added to the group of multiple egress interfaces; and in response to determining that the additional egress interface is to be added to the group of multiple egress interfaces, replacing values in a subset of elements in the table with a new value that indicates the additional egress interface.

The method further includes selecting the subset of elements so that elements in the table are balanced across the group of multiple egress interfaces including the additional egress interface.

The method further includes: determining, at the network device, that a current egress interface is to be removed from the group of multiple egress interfaces; and in response to determining that the current egress interface is to be removed from the group of multiple egress interfaces, replacing first values in the table that indicate the current egress interface with second values that indicate other egress interfaces in the group.

Replacing the first values comprises randomly selecting the second values that are to replace the first values.

Replacing the first values comprises selecting the second values that are to replace the first values in a round-robin manner.

Replacing the first values comprises selecting the second values that are to replace the first values based on respective traffic loads of the other egress interfaces in the group.

In yet another embodiment, a method in a network device is for maintaining a table stored in a memory of the network device, the table corresponding to a group of multiple egress interfaces of the network device. The method includes: determining, at the network device, that a current egress interface in the group of multiple egress interfaces is inoperable; and in response to determining that the current egress interface in the group of multiple egress interfaces is inoperable, replacing first values in the table that indicate the current egress interface with second values that indicate other egress interfaces in the group.

In other embodiments, the method includes any one of or any suitable combination of two or more of the following features.

Replacing the first values comprises randomly selecting the second values that are to replace the first values.

Replacing the first values comprises selecting the second values that are to replace the first values in a round-robin manner.

Replacing the first values comprises selecting the second values that are to replace the first values based on respective traffic loads of the other egress interfaces in the group.

The method further includes: determining, at the network device, that an additional egress interface is to be added to the group of multiple egress interfaces; and in response to determining that the additional egress interface is to be added to the group of multiple egress interfaces, replacing values in a subset of elements in the table with a new value that indicates the additional egress interface.

The method further includes selecting the subset of elements so that elements in the table are balanced across the group of multiple egress interfaces including the additional egress interface.

DETAILED DESCRIPTION

Embodiments are described herein in the context of selecting an egress interface from a group of egress interfaces. As used herein, the term "egress interface" refers to a network interface via which a packet is to be transmitted by a network device. According to various embodiments, examples of egress interfaces include physical ports, logical ports, logical network interfaces, end-to-end network paths, paths through switch fabrics, etc.

Figure 1:
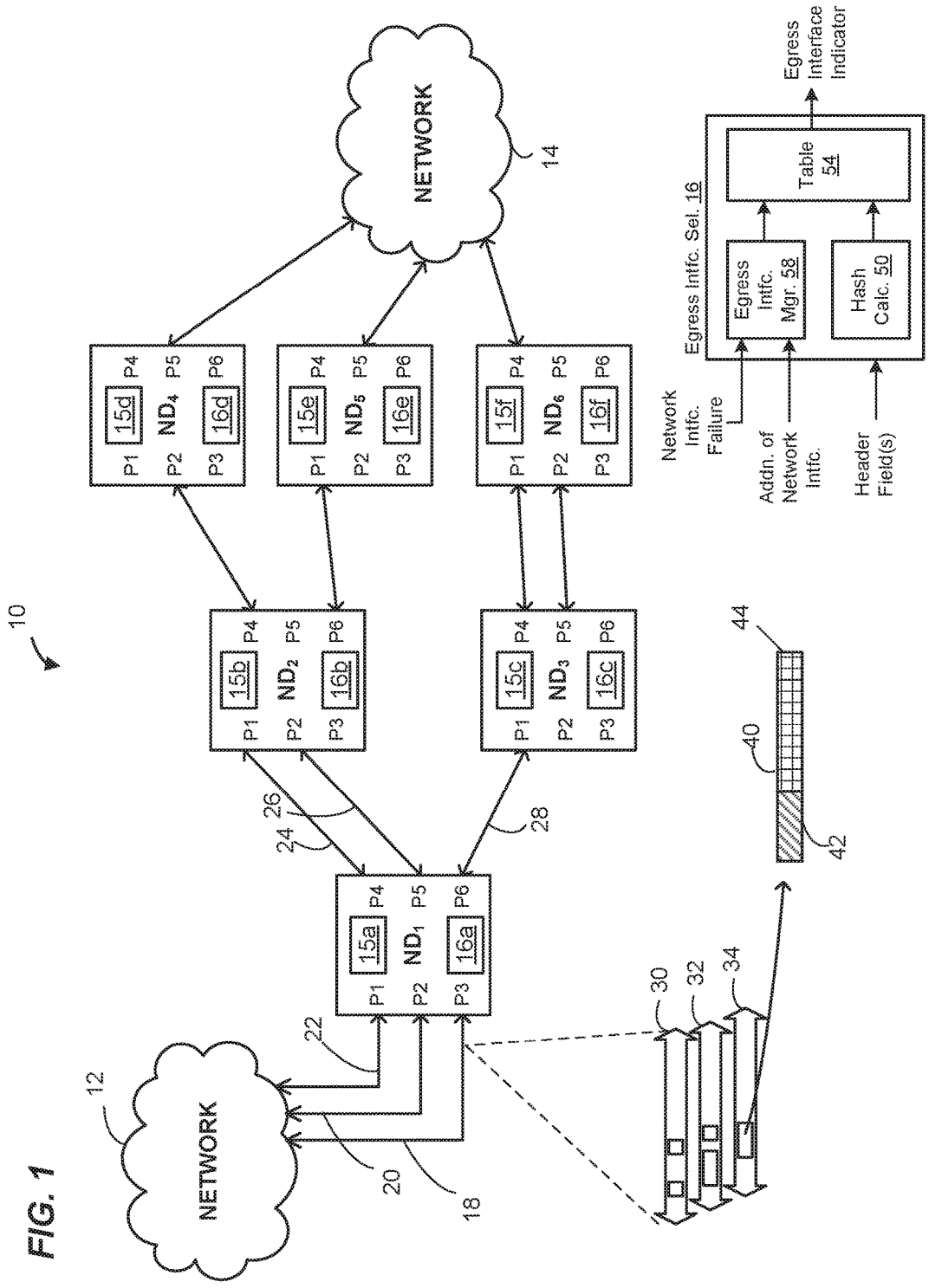
FIG. 1 is a block diagram of a communication network in which network devices apply network interface selection techniques discussed herein, according to an embodiment.

FIG. 1 is a block diagram of an example communication network 10 in which several network devices $ND_1$, $ND_2$, . . . , $ND_6$ process data flows between an external network 12 and an internal network 14, according to an embodiment. In some embodiments, the network 10 utilizes load-balancing across multiple network paths. The network devices $ND_1$-$ND_6$ may be of the same or different types of network devices, and include workgroup switches, other types of switches, routers, or any other suitable network devices having data processing capability, in various embodiments.

Each of the network devices $ND_1$-$ND_6$ includes a respective packet processor 15a-15f that is configured to determine via which network interfaces of the network device packets are to be egressed. In some embodiments, a respective forwarding engine in each packet processor 15 determines via which network interfaces of the network device packets are to be egressed. In some embodiments, each network device includes a different implementation of the packet processor 15, or a subset of the devices $ND_1$-$ND_6$ includes a packet processor 15 of the same structure.

Each of the network devices $ND_1$-$ND_6$ includes a respective egress interface selector 16a-16f that implements egress interface selection techniques discussed below, in an embodiment. In some embodiments, only one of the network devices (e.g., network device $ND_1$) includes an egress interface selector 16, or only some of the devices $ND_1$-$ND_6$ include a respective egress interface selector 16.

In operation, the network device $ND_1$ receives data units (such as packets or frames (hereinafter referred to as "packets" merely for ease of explanation and brevity)) traveling from the external network 12 to the internal communication network 14 via communication links 18, 20, and 22 at respective ports P1, P2, and P3 (generally referred to herein as "ingress ports" or "source ports" $P_R$). The packet processor 15*a* determines (e.g., by analyzing headers in the packets) that certain packets are to be egressed by a group of ports P4, P5, and P6. Thus, the network device $ND_1$ forwards the certain packets to the network devices $ND_2$ or $ND_3$ via the corresponding ports P4, P5, and P6 (generally referred to herein as "egress ports" or "target ports" $P_T$) and, ultimately, respective communication links 24, 26, and 28. The ports P1-P6 are examples of network interfaces, according to some embodiments.

The routing configuration of the load-balancing network 10, in some scenarios, is such that the network device $ND_1$ selects one of the ports of P4, P5, or P6 to properly direct a data packet toward its destination in the internal network 14. In order to increase bandwidth to the destination, the communication links 24, 26, and 28 are treated as a single logical link, and the network device $ND_1$ applies load-balancing techniques to distribute the received packets among the appropriate ones of the links 24, 26, and 28, according to some embodiments. For example, the network device $ND_1$ selects ones of the ports P4, P5, P6 corresponding to ones of the links 24, 26, and 28. To this end, the network device $ND_1$ utilizes the egress interface selector 16*a* to select one of the ports P4, P5, P6, in an embodiment. For example, in an embodiment, the egress interface selector 16*a* uses a hash function to generate a hash value, and uses the hash value to select one of the ports P4, P5, P6 via which a packet is to be egressed, in an embodiment. In some embodiments, one or more of the egress interface selectors 16 also utilize load-balancing techniques such as described in U.S. Pat. No. 8,756,424 to distribute transmission of packets across multiple network paths. In other embodiments, one or more of the egress interface selectors 16 utilize other suitable load-balancing techniques to distribute transmission of packets across multiple network paths.

Although FIG. 1 illustrates a particular embodiment of the network devices $ND_1$-$ND_6$, each of these the network devices $ND_1$-$ND_6$ includes any suitable number of ports, and at least some of the network devices $ND_1$-$ND_6$ have different numbers of ports. In some embodiments, configurations, and/or scenarios, some or all of the packet processors 15 perform protocol translation for some of the packets by removing and/or adding protocol headers at one or several protocol layers of a corresponding communication protocol stack.

The links 18, 20, 22 correspond to different physical communication channels such as network cables, wireless bands, etc., or logical channels such as timeslots of a digital signal 1 (DS1) line, to take one example, in various embodiments. Similarly, ports P1, P2, P3 correspond to physical or logical resources of the network device $ND_1$, in various embodiments.

As illustrated in FIG. 1, the link 18 carries one or more data flows 30, 32, 34. Typically but not necessarily, each of the data flows 30, 32, 34 is a bidirectional flow including data traveling from the network 12 to the network 14, or inbound data, and data traveling to the network 12 from the network 14, or outbound data. The links 20 and 22 also carry one or several data flows, in an embodiment. Some of the data flows 30, 32, 34 are associated with more than one of the links 18-22, in an embodiment.

In some embodiments and/or scenarios, the data flows 30, 32, 34 are associated with different communication protocols such as Transmission Control Protocol (TCP) layered over Internet Protocol (IP) (hereinafter, "TCP/IP"), User Datagram Protocol (UDP) layered over IP (hereinafter, "UDP/IP"), File Transfer Protocol (FTP), Hypertext Transfer Protocol (HTTP), etc. For example, the data flow 30 corresponds to FTP, the data flow 32 corresponds to Telnet, and the data flow 34 corresponds to HTTP, in one scenario. Further, some of the data flows 30-34 correspond to different sessions associated with the same communication protocol, in some scenarios. A typical network link also includes Simple Mail Transfer Protocol (SMTP), Structured Query Language (SQL), and several additional data flows associated with e-mailing, web browsing, database applications, remote login, and other application types.

In some scenarios, each of the data flows 30, 32, 34 includes multiple streams, sessions, or connections corresponding to various communication protocol layers. It is noted that some protocols, such as TCP, are connection-oriented while others, such as UDP, are connectionless. In one example scenario, an outside host on the network 12 connects to a local host on the network 14 by establishing a TCP connection having a particular address and port combination on both ends. This connection is identifiable by the TCP header specifying, in part, the address of the outside host, the address of the local host, the port on the outside host, and the port on the local host. An individual TCP/IP packet carries a certain quantum or chunk of information associated with the same connection, or communication session. On the other hand, in another example scenario, a pair of hosts uses the UDP protocol to exchange individual messages, or datagrams, without establishing a connection. Thus, in some scenarios, each of the data flows 30, 32, 34 includes one or more streams such as TCP streams including multiple packets associated with a single data exchange or single packets conveying individual messages in their entirety. In the examples discussed below, a data stream generally refers to a unidirectional or bidirectional data exchange between two or more hosts including one or more data units such as data packets or frames.

With continued reference to FIG. 1, an example data packet 40 in the flow 34 includes a header 42 and a payload 44. In general, the header 42 corresponds to one or more layers of a protocol stack. A forwarding engine (not shown in FIG. 1) of the packet processor 15 is configured to analyze the header 42 to determine via which port or ports the packet 40 should be egressed. For example, in some embodiments, the forwarding engine of the packet processor 15 uses a portion of the header 42, such as a destination address, to look up in a forwarding database (not shown in FIG. 1) an indication of a port or ports via which the packet 40 is to be egressed. In some embodiments, the indication of the port or ports via which the packet 40 is to be egressed is an indication of a group of ports (e.g., a LAG group, sometimes referred to as a "trunk"), and the egress interface selector 16 selects one of the ports within the group. More generally, in some embodiments, the forwarding engine of the packet processor 15 identifies a group of network interfaces such as a LAG group, a group of links, an ECMP group, a WCMP group, a group of paths through a switch fabric, etc., and the egress interface selector 16 selects one of the ports/links/paths within the group.

In some embodiments, when the forwarding engine of the packet processor 15*a* identifies a group of ports (e.g., the group P4, P5, P6) for a packet, the egress interface selector 16*a* selects one of the ports P4, P5, P6 using a hash function, according to an embodiment. For example, the egress interface selector 16 includes a hash calculator 50 that is configured to calculate a hash output using i) one or more fields of a header of a packet, and ii) a hash function, in an embodiment. The hash output is then used as an index into a table 54 associated with the group of ports identified by the forwarding engine for egressing the packet, where entries of the table 54 include indications of particular ports among the group of ports, in an embodiment. The table entry indexed by the hash output indicates a particular port via which the packet is to be transmitted, in an embodiment. The table 54 is stored in a memory device, and different entries in the table 54 correspond to different memory locations in the memory device, according to an embodiment. In an embodiment, the hash output specifies an address in the memory device.

The egress interface selector 16 also includes an egress interface manager 58, in an embodiment. The egress interface manager 58 is configured to manage the table 54 associated with the group of ports. For instance, in some embodiments, when a current one of the ports in the group becomes inoperable, the egress interface manager 58 modifies the table 54 so that i) first packet flows that were being transmitted via the one port are switched to one or more remaining ports in the group, and ii) second packet flows that were already being transmitted via the remaining ports do not switch ports. For example, according to an embodiment, in response to a current one of the ports in the group becoming inoperable, the egress interface manager 58 searches the table 54 for entries with a value corresponding to the one port, and replaces the value in those entries with one or more other values corresponding to one or more other ports in the group.

In some embodiments, when a new port is added to the group of existing ports, the egress interface manager 58 modifies the table 54 so that a subset of packet flows that were being transmitted via the existing ports are switched to the new port. For example, according to an embodiment, in response to a new port being added to the group, the egress interface manager 58 replaces a subset of entries in the table 54 with a value corresponding to the new port.

A port is considered inoperable when, for example, the port itself or a corresponding network link coupled to the port cannot be used, in some embodiments. For example, in various embodiments, a port cannot be used if the port itself fails, a corresponding network link coupled to the port fails, etc. As discussed above, ports are examples of network interfaces. In other embodiments, a network interface corresponds to virtual port, or another suitable interface.

Selection of a port or group of ports by the forwarding engine is merely an example of selecting a network interface or group of network interfaces via which a packet is to be transmitted by the network device, i.e., an egress interface. In some embodiments, other examples of egress interfaces include logical ports, logical network interfaces, end-to-end paths in a network, paths through a switch fabric, etc.

Figure 2B:
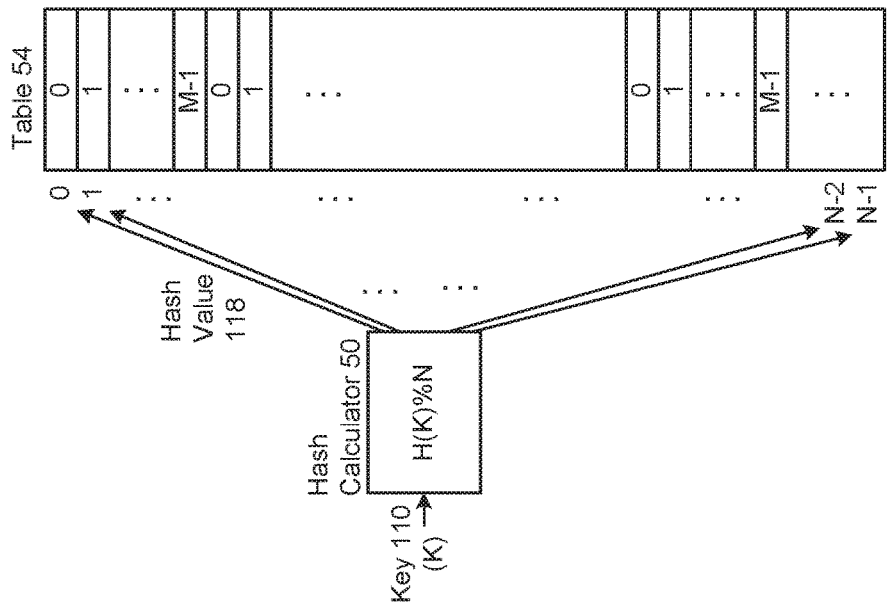
FIG. 2B is a diagram of the example egress interface selector of FIG. 2A, according to an embodiment.
Figure 2A:
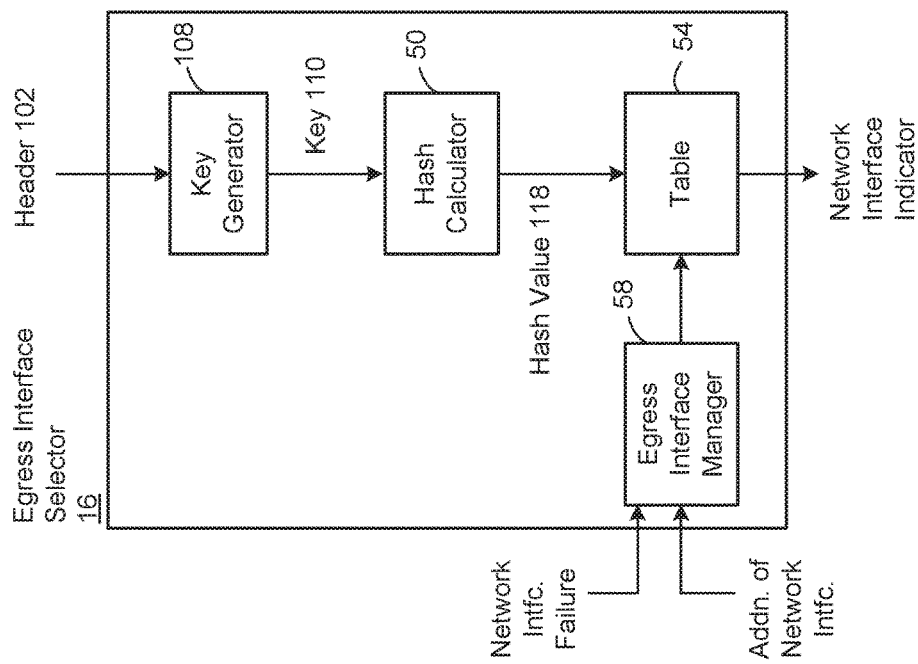
FIG. 2A is a block diagram of an example egress interface selector which is implemented in one or more of the network devices of FIG. 1, according to an embodiment.

FIG. 2A is a more detailed block diagram of the example egress interface selector 16 of FIG. 1, according to an embodiment. The egress interface selector 16 is configured to receive at least a portion 102 of a header of a packet (for ease of explanation and brevity, the term "at least the portion 102 of the header" will be referred to as "the header 102"), according to an embodiment. A key generator 108 generates a key 110 based on the header 102. For example, in an embodiment, the key generator 108 is configured to generate the key based on one or more portions of the header 102, such as one or more of at least a portion of an address field, a virtual local area network (WAN) identifier, etc., and/or one or more other suitable fields of the header 102 (e.g. layer 3 header fields, layer 4 header fields, etc.).

A hash calculator 114 applies a selected hash function to the key 110 to generate a hash output value 118. The hash output value 118 is then used as an index into the table 54 to select one entry from multiple entries in the table 54. A value stored in the selected entry in the table 54 is then used to select an egress interface for transmitting the packet. As merely an illustrative example, if the group of network interfaces consists of four members, each member in the group is assigned a respective value of 0, 1, 2, or 3, and entries in the table 54 have values selected from a set consisting of 0, 1, 2, or 3, according to an illustrative embodiment.

In some embodiments, the table 54 includes N entries, where N is a suitable positive integer. In some embodiments, values of entries in the table 54 have values selected from a set consisting of M values, where M is a positive integer corresponding to the number of egress interfaces in the group. In some embodiments, N is much greater than M. For example, in some embodiments, N is at least two times M. In some embodiments, N is at least four times M. In some embodiments, N is at least eight times M. In some embodiments, N is at least an order of magnitude larger than M.

In some embodiments, the egress interface selector 16 is configured to perform a modulo-N operation on the hash output value 118, where the hash calculator 50 is configured to generate values in a range of 0 to P, and where P is a suitable positive integer greater than N. In some embodiments, the hash calculator 50 includes a modulo-N calculator (not shown in FIG. 2A). In some embodiments, the hash calculator 50 is configured to perform another suitable operation that suitably maps first values in the range 0 to P to second values in the range 0 to N. In another embodiment, the selected hash function used by the hash calculator is designed to generate a hash value 118 in a suitable range having N values.

FIG. 2B is a diagram illustrating use of the hash value 118 as an index into the table 54, according to an embodiment. In hash calculator 50 generates a hash value 118 from the key 110 so that the hash value 118 has a value from the set consisting of 0, 1, . . . , N−1. The hash value 118 is then used as an index into the table 54, which includes N entries. Each entry in the table 54 has a value from the set consisting of 0, 1, . . . , M−1, where M is the number of egress interfaces in the group of egress interfaces.

In some embodiments, the egress interface selector 16 is configured to maintain a plurality of tables 54 for multiple different groups of egress interfaces. In some embodiments, the plurality of tables 54 are stored in a single memory device. In other embodiments, the plurality of tables 54 are stored in multiple memory devices. In some embodiments, the egress interface selector 16 is configured to use the same hash function for all of the multiple different groups of egress interfaces. In other embodiments, the egress interface selector 16 is configured to use different hash functions for different groups of egress interfaces, thus avoiding polarization of the selection among different groups.

Figure 3:
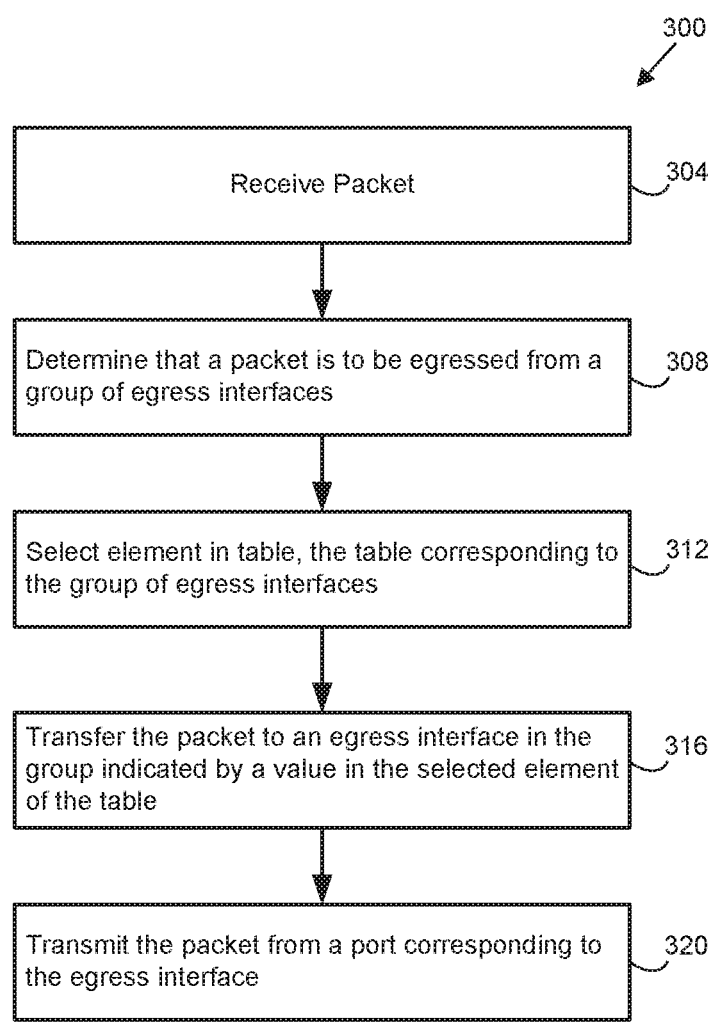
FIG. 3 is a flow diagram of an example method for selecting an egress interface within a group of egress interfaces that is implemented by one or more of the network devices of FIG. 1 and/or by the example egress interface selector of FIG. 2A, according to an embodiment.

FIG. 3 is a flow diagram of an example method 300 for processing packets in a network device, according to an embodiment. The network device $ND_1$ of FIG. 1, including the egress interface selector 16, is configured to implement the method 300, according to an embodiment, and the method 300 is discussed with reference to FIGS. 1, 2A, and 2B merely for explanatory purposes. In other embodiments, however, the method 300 is implemented by another suitable network device. Similarly, in other embodiments, the network device $ND_1$ of FIG. 1 is configured to implement a suitable method different than the method 300.

At block 304, a packet is received at a network device (e.g., the network device $ND_1$). As merely an illustrative example, in an embodiment, the packet is received via port P1 of the network device $ND_1$.

At block 308, a packet processor of the network device determines that the packet is to be egressed from the network device via a group of network interfaces (sometimes referred to herein as "a group of egress interfaces"). For example, a forwarding engine in the packet processor 15 is configured to utilize a forwarding database to determine via which network interfaces packets are to be egressed, as discussed above, according to some embodiments. In some scenarios, the forwarding database indicates the group of egress interfaces for certain packets.

At block 312, the network device selects an element of a table, the table corresponding to the group of egress interfaces, according to an embodiment. In some embodiments, the network device uses i) a hash function, and ii) header information of the packet to generate a hash output value, and then uses the hash output value to select the element of the table. For example, in an embodiment, the network device uses the hash output value as an index into the table.

Referring to FIGS. 1, 2A, and 2B, the key generator 108 generates the key 110 from one or more fields of the header, and the hash calculator 50 calculates the hash value 118 using a hash function and the key 110. The hash value 118 is then used to select an element of the table 54. In some embodiments, the hash calculator 50 is configured to generate the hash value 118 so that the hash value 118 falls within a range of N values, where N is the number of elements of the table 54. In some embodiments, a modulo-N operation is performed on the hash value 118 prior to using the hash value 118 to select the element of the table 54.

At block 316, the packet is forwarded to an egress interface in the group indicated by a value stored in the element of the table determined at block 312. For example, in an embodiment, elements of the table store indicators (e.g., identifiers) of egress interfaces in the group, and the indicator stored in the element selected at block 312 is utilized to determine the egress interface to which the packet is to be forwarded. In some embodiments, the group of egress interfaces includes a group of ports, and block 316 includes forwarding the packet to a port indicated by the value stored in the element of the table determined at block 312. In some embodiments, the group of egress interfaces includes a group of logical ports, and block 316 includes forwarding the packet to a logical port indicated by the value stored in the element of the table determined at block 312.

At block 320, the packet is transmitted from a port corresponding to the egress interface. For example, in some embodiments, the egress interface is a logical port, and block 320 includes transmitting the packet from a physical port corresponding to the logical port. In some embodiments, the egress interface is a physical port, and block 320 includes transmitting the packet from the physical port.

In some embodiments, an egress interface selector such as the egress interface selector 16 facilitates improved handling of failures of network interfaces. For instance, with at least some prior art network devices, a failure of a network link in a LAG would result in at least some flows being changed from one working link in the LAG to another working link in the LAG, and thus the paths via which packets in the flows traveled would be changed. When the path via which packets in a flow travel is changed, this may result in some packets in the flow arriving at an endpoint out-of-order. For example, if the new path has less delay than the old path, some packets transmitted on the new path might arrive at the endpoint before packets that were transmitted earlier on the old path. In some embodiments and/or scenarios, however, an egress interface selector such as the egress interface selector 16 remaps packets flows on a failed network interface in a group to other working network interfaces, but does not remap packets flows that were already on the working network interfaces.

Similarly, in some embodiments, an egress interface selector such as the egress interface selector 16 facilitates improved handling of an addition of a new network interface to a group of egress interfaces. For instance, with at least some prior art network devices, addition of a new network link to a LAG would result in many flows being changed from one existing link in the LAG to another existing link in the LAG, and thus the paths via which packets in the flows traveled would be changed, leading to problems such as discussed above. In some embodiments and/or scenarios, however, an egress interface selector such as the egress interface selector 16 remaps packets of only a subset of flows on existing network interfaces in a group to a new network interface being added to the group, but does not remap remaining packet flows on existing network interfaces.

Figure 4:
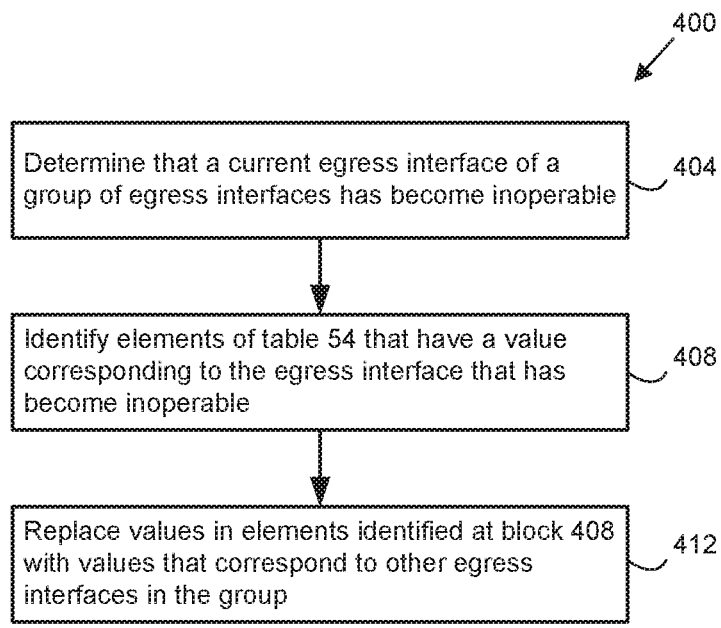
FIG. 4 is flow diagram of an example method for handling an egress interface, within a group of egress interfaces, that has become inoperable, the method being implemented by one or more of the network devices of FIG. 1 and/or by the example egress interface selector of FIG. 2A, according to an embodiment.

FIG. 4 is a flow diagram of an example method 400 for updating a table corresponding to a group of egress interfaces in response to one of the egress interfaces in the group becoming inoperable, according to an embodiment. The network device $ND_1$ of FIG. 1, including the egress interface selector 16, is configured to implement the method 400, according to an embodiment, and the method 400 is discussed with reference to FIGS. 1, 2A, and 2B merely for explanatory purposes. In other embodiments, however, the method 400 is implemented by another suitable network device. Similarly, in other embodiments, the network device $ND_1$ of FIG. 1 is configured to implement a suitable method different than the method 400.

In an embodiment, the method 400 is performed in conjunction with a table corresponding to a group of egress interfaces, where the table includes table elements that store indicators of egress interfaces in the group. In an embodiment, the table is utilized to select egress interfaces in the group for transmitting packets.

At block 404, a network device (e.g., the network device $ND_1$) determines that a current egress interface in the group of egress interfaces has become inoperable. In some embodiments, the egress interface manager 58 receives a notification that the current egress interface is inoperable. As merely an illustrative example, in an embodiment, the egress interface selector 16 of the network device $ND_1$ determines that port P4 of the network device $ND_1$ has become inoperable. For instance, a port is considered inoperable when, for example, the port itself or a corresponding network link coupled to the port cannot be used, in some embodiments. For example, in various embodiments, a port cannot be used if the port itself fails, a corresponding network link coupled to the port fails, etc. As discussed above, ports are merely examples of egress interfaces. In other embodiments, an egress interface corresponds to virtual port, an end-to-end path through a network, a path through a switch fabric, etc.

At block 408, in response to determining at block 404 that the current egress interface has become inoperable, the table, which corresponds to the group of egress interfaces, the network device identifies table elements that contain a value corresponding to the current egress interface that has become inoperable. For example, in an embodiment, the egress interface manager 58 identifies table elements in the table 54 that contain the value corresponding to the current egress interface that has become inoperable. Referring to FIG. 2B, if the value in table 54 that corresponds to the current egress interface that has become inoperable is five (as merely an illustrative example), then entries in the table 54 having the value five are identified.

At block 412, also in response to determining at block 404 that the current egress interface has become inoperable, values in the table elements identified at block 408 are replaced with values corresponding to other egress interfaces in the group. For example, in an embodiment, the egress interface manager 58 replaces values in the table elements identified at block 408 with values corresponding to other egress interfaces in the group. In an embodiment, replacement values are chosen randomly from values corresponding to other egress interfaces in the group. In another embodiment, replacement values are chosen in a round-robin manner from values corresponding to other egress interfaces in the group. In another embodiment, replacement values are chosen in a weighted manner so that values corresponding to egress interfaces with less traffic load are chosen more frequently than values corresponding to egress interfaces with higher traffic load.

Continuing with the illustrative example above entries in the table 54 having the value five (corresponding to the egress interface that became inoperable) are replaced with values corresponding to other egress interfaces in the group.

When all of the values in the table elements identified at block 408 are replaced, the egress interface selector 16 will no longer select the egress interface that has become inoperable, according to some embodiments. Additionally, because only values in the table elements identified at block 408 are replaced, packet flows on the working egress interfaces are not remapped, according to some embodiments.

Figure 5:
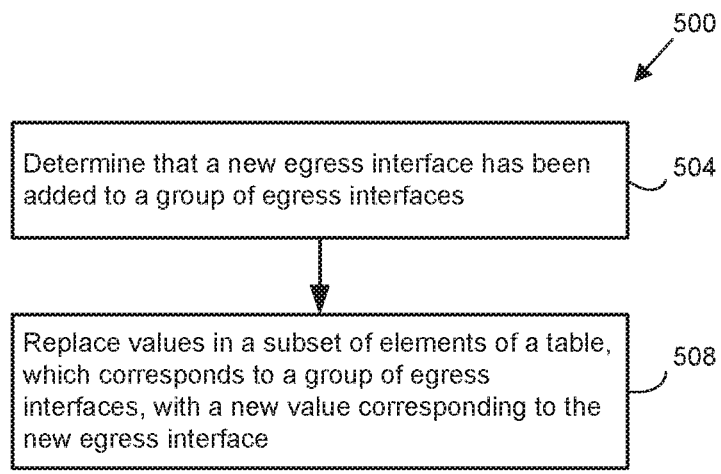
FIG. 5 is flow diagram of an example method for handling a new egress interface being added to a group of egress interfaces, the method implemented by one or more of the network devices of FIG. 1 and/or by the example egress interface selector of FIG. 2A, according to an embodiment.

FIG. 5 is a flow diagram of an example method 500 for updating a table corresponding to a group of egress interfaces in response to a new egress interface being added to the group, according to an embodiment. The network device ND$_1$ of FIG. 1, including the egress interface selector 16, is configured to implement the method 500, according to an embodiment, and the method 400 is discussed with reference to FIGS. 1, 2A, and 2B merely for explanatory purposes. In other embodiments, however, the method 500 is implemented by another suitable network device. Similarly, in other embodiments, the network device ND$_1$ of FIG. 1 is configured to implement a suitable method different than the method 500.

In an embodiment, the method 500 is performed in conjunction with a table corresponding to a group of egress interfaces, where the table includes table elements that store indicators of egress interfaces in the group. In an embodiment, the table is utilized to select egress interfaces in the group for transmitting packets.

At block 504, a network device (e.g., the network device ND$_1$) determines that a new egress interface is to be added to the group of egress interfaces. In some embodiments, the egress interface manager 58 receives a notification that the new egress interface is being added to the group. As merely an illustrative example, in an embodiment, the egress interface selector 16 of the network device ND$_1$ determines that a port of the network device ND$_1$ is being added to a group of ports. As discussed above, ports are examples of egress interfaces. In other embodiments, an egress interface corresponds to virtual port, or another suitable network interface.

At block 508, in response to determining at block 504 that the new egress interface is being added to the group, values in a subset of elements of the table, which corresponds to the group of egress interfaces, are replaced with a new value corresponding to the new egress interface, according to an embodiment. In an embodiment, block 508 includes selecting the subset of elements so that, after values in the subset of entries are replaced, entries in the table are balanced among the egress interfaces in the group. As merely an illustrative example (and referring to FIG. 2B), before addition of the new egress interface to the group, N=100, M=3, and 33 elements of the table 54 corresponded to a first egress interface, 33 elements of the table 54 corresponded to a second egress interface, and 34 elements of the table 54 corresponded to a third egress interface. After adding a new, fourth, egress interface, M increases from three to four, and eight elements corresponding to the first egress interface are selected and replaced with a value corresponding to the fourth egress interface; eight elements corresponding to the second egress interface are selected and replaced with the value corresponding to the fourth egress interface; and nine elements corresponding to the third egress interface are selected and replaced with the value corresponding to the fourth egress interface. Thus, 25 elements of the table 54 then correspond to the first egress interface, 25 elements of the table 54 then correspond to the second egress interface, 25 elements of the table 54 then correspond to the third egress interface, and 25 elements of the table 54 then correspond to the fourth egress interface.

After values in the table elements are replaced at block 508, the egress interface selector 16 will sometimes select the new egress interface, according to some embodiments. Additionally, because only a subset of table elements are replaced at block 508, many packet flows on the egress interfaces previously in the group are not remapped to different egress interfaces, according to some embodiments.

At least some of the various blocks, operations, and techniques described above may be implemented utilizing hardware (e.g., one or more integrated circuit devices), a processor (e.g., implemented using one or more integrated circuit devices) executing firmware instructions, a processor (e.g., implemented using one or more integrated circuit devices) executing software instructions, or any combination thereof.

Although the forgoing text sets forth a detailed description of numerous different embodiments, it should be understood that the scope of the patent is defined by the words of the claims set forth at the end of this patent. The detailed description is to be construed merely as providing illustrative examples and does not describe every possible embodiment because describing every possible embodiment would be impractical, if not impossible. Numerous alternative embodiments could be implemented, using either current technology or technology developed after the filing date of this disclosure, which would still fall within the scope of the claims.

What is claimed is:

1. A network device, comprising:
  a plurality of egress interfaces configured to transmit packets;
  a forwarding engine configured to select one or more groups of multiple egress interfaces for forwarding packets received by the network device; and
  an egress interface selector configured to select individual egress interfaces within the one or more groups selected by the forwarding engine, the egress interface selector including:
    a table associated with a first group of multiple egress interfaces, wherein elements in the table include values indicating individual egress interfaces in the first group, and wherein a size of the table is at least an order of magnitude greater than a size of the first group, and a table element selector configured to, when the forwarding engine selects the first group of multiple egress interfaces for forwarding a packet, select an element in the table to identify the individual egress interface for forwarding the packet.

2. The network device of claim 1, wherein:

the table element selector includes a hash calculator configured to generate an output using i) a hashing function and ii) header information of the packet, wherein the output indicates the element in the table that is to be selected.

3. The network device of claim 2, wherein:

the table includes N elements, wherein N is suitable positive integer; and the hash calculator is configured to generate the output so that the output is from a set of N possible values.

4. The network device of claim 3, wherein:

the hash calculator is configured to perform a modulo-N operation on an initial output.

5. The network device of claim 1, further comprising:

an egress interface group manager configured to, in response to determining that an additional egress interface is to be added to the first group of multiple egress interfaces, replace values in a subset of elements in the table with new values that indicate the additional egress interface.

6. The network device of claim 5, wherein the egress interface group manager is configured to select the subset of elements so that elements in the table are balanced across the first group of multiple egress interfaces including the additional egress interface.

7. The network device of claim 1, further comprising:

an egress interface group manager configured to, in response to determining that a current egress interface is to be removed from the first group of multiple egress interfaces, replace first values in the table that indicate the current egress interface with second values that indicate other egress interfaces in the first group.

8. The network device of claim 7, wherein the egress interface group manager is further configured to, when replacing the first values in the table, randomly select the second values that are to replace the first values.

9. The network device of claim 7, wherein the egress interface group manager is further configured to, when replacing the first values in the table, select the second values that are to replace the first values in a round-robin manner.

10. The network device of claim 7, wherein the egress interface group manager is further configured to, when replacing the first values in the table, select the second values that are to replace the first values based on respective traffic loads of the other egress interfaces in the group.

11. A method for selecting an egress interface, comprising:

receiving a packet at a network device;

selecting, at the network device, a group of multiple egress interfaces for transmitting the packet, the group from a plurality of egress interfaces of the network device;

in response to selecting the group, selecting, at the network device, an element in a table corresponding to the group, wherein entries in the table indicate individual egress interfaces in the group, and wherein a size of the table is at least an order of magnitude greater than a size of the group; and transferring the packet to an egress interface in the group indicated by a value in the selected element of the table so that the packet can be transmitted by the egress interface in the group indicated by the value in the selected element of the table.

12. The method of claim 11, wherein selecting the element in the table comprises:

calculating, at the network device, a hash value using header information of the packet; and using the hash value as an index into the table.

13. The method of claim 12, wherein:

the table includes N elements;

N is suitable positive integer; and calculating the hash value comprises at least one of:
i) calculating the hash value so that the hash value is from a set of N possible values, and
ii) calculating an initial hash value and performing a modulo-N operation on the initial hash value.

14. The method of claim 11, further comprising:

determining, at the network device, that an additional egress interface is to be added to the group of multiple egress interfaces; and in response to determining that the additional egress interface is to be added to the group of multiple egress interfaces, replacing values in a subset of elements in the table with a new value that indicates the additional egress interface.

15. The method of claim 14, further comprising selecting the subset of elements so that elements in the table are balanced across the group of multiple egress interfaces including the additional egress interface.

16. The method of claim 11, further comprising:

determining, at the network device, that a current egress interface is to be removed from the group of multiple egress interfaces; and in response to determining that the current egress interface is to be removed from the group of multiple egress interfaces, replacing first values in the table that indicate the current egress interface with second values that indicate other egress interfaces in the group.

17. The method of claim 16, wherein replacing the first values comprises randomly selecting the second values that are to replace the first values.

18. The method of claim 16, wherein replacing the first values comprises selecting the second values that are to replace the first values in a round-robin manner.

19. The method of claim 16, wherein replacing the first values comprises selecting the second values that are to replace the first values based on respective traffic loads of the other egress interfaces in the group.

* * * * *